United States Patent Office 3,539,652
Patented Nov. 10, 1970

3,539,652
PREPARATION OF CIS-1,4-DIENES
Wolfgang Schneider, Brecksville, Ohio, assignor to The B. F. Goodrich Company, New York, N.Y., a corporation of New York
No Drawing. Filed Oct. 31, 1968, Ser. No. 772,391
Int. Cl. C07c 11/16, 11/18, 11/20
U.S. Cl. 260—680                                    9 Claims

ABSTRACT OF THE DISCLOSURE

Cis-1,4-dienes, which are useful third monomers in the preparation of vulcanizable rubbers with ethylene and propylene, are obtained by reacting a 1,3-diene containing 4 to 6 carbon atoms with ethylene in the presence of a catalyst comprising reducible iron compound, an alkyl aluminum compound and an aliphatic amine containing a carboxyl group, and aryl amines containing a phenyl and at least one of a hydroxyl, carboxyl or nitro group.

CROSS REFERENCE TO RELATED APPLICATION

This is a continuation-in-part of my copending application, Ser. No. 469,880, filed July 5, 1965, now Pat. No. 3,441,627.

BACKGROUND OF THE INVENTION 1,4-hexadiene is used as a third monomer in preparing vulcanizable rubbers of ethylene and propylene terpolymers. In preparing 1,4-hexadiene by known methods, a mixture of cis- and trans-isomers is obtained. It is desirable to have an all cis-1,4-hexadiene available for preparing vulcanizable ethylene-propylene rubbers. At present cis-1,4-hexadiene is an expensive monomer since it first must be separated from the trans-isomer and the trans-isomer then discarded, which represents a loss of costly raw materials.

SUMMARY OF THE INVENTION

This invention provides an economical method for readily preparing 1,4-hexadiene, methyl-1,4-hexadienes and 1,4-heptadiene of predominately cis-structure in high yields to the substantial exclusion of the trans-structure which comprises reacting a 1,3-diene such as butadiene, isoprene or piperylene and ethylene in the presence of a catalyst which is formed by reacting together a reducible iron compound with a reducing agent such as alkyl aluminum compounds, and an organic nitrogen compound containing 2 to 12 carbon atoms which may be certain aliphatic amines containing a carboxyl group, and aryl amines containing a phenyl and at least one of a hydroxyl, carboxyl or nitro group.

DETAILED DESCRIPTION

The reducible iron compound may be any di-or trivalent compound of iron which is readily reduced by an alkyl metal compound. Useful iron compounds include the chlorides, bromides, sulfates, hydroxides, nitrates, oxalates and other salts of inorganic and organic acids. Organic compounds useful in the process are iron chelates in which the iron is attached to two functional groups of a molecule by a main valence bond and coordinately, for example, iron acetylacetonate. The iron compounds are preferably used in an anhydrous state.

The alkyl aluminum compounds preferably have the formula $R_3Al$ wherein R is an alkyl group containing 1 to 12 carbon atoms, preferably 2 to 8. Typical compounds include triethyl aluminum, tributyl aluminum, triisobutyl aluminum, and mixtures thereof.

The organic nitrogen compound employed must be particular types of compounds, for example, the organic nitrogen compounds found useful are those containing 2 to 12 carbon atoms including aliphatic amines containing a carboxyl group including, for example, glycine, alanine, leucine, aspartic acid, glutamic acid and the like; and cyclic amines containing a phenyl and at least one of a hydroxyl, carboxyl or nitro group, for example, aminophenol, phenyl alanine, p-aminophenyl acetic acid, m-aminobenzoic acid, 2-amino-4-nitro phenol; trichloroaniline; and the like.

In the preparation of the catalyst, the iron compound and organic nitrogen compound reducing agent are reacted together in the presence of a 1,3-diene. Suitable 1,3-dienes are butadiene-1,3, isoprene and piperylene.

The reaction may be conducted over a wide range of temperatures and pressures. Normally, the reaction is conducted at a temperature above room temperature, that is, about 25° C. to temperatures as high as about 250° C. More preferably, the reactions are conducted at temperatures, in the range of about 50° C. to 150° C. At higher temperatures, the catalyst decomposes, and undesirable by-products are formed.

The reaction may be carried out at atmospheric pressure, but usually is at higher pressure. This is determined by the vapor pressure of the 1,3-diene and the solubility of ethylene in the 1,3-diene at that temperature and pressure. The pressure of the reactor may range from about 100 p.s.i.g. to about 5,000 p.s.i.g., more normally from about 200 p.s.i.g. to about 1,000 p.s.i.g., and more preferably less than 1,000 p.s.i.g. as 500 p.s.i.g. if no solvent is present.

The molar ratio of reactants include from about $10^{-1}$ to $10^{-8}$, preferably $10^{-3}$ to $10^{-5}$ mols of iron per mol of butadiene-1,3; 0.1 to 10 mols of nitrogen compound per mol of iron, preferably 0.25 to 2 mols per mol of iron; and 1 mol of iron to 1 and 10 mol equivalents of reducing compound.

It is convenient to carry out the new process in the starting materials (1,3-diene) without a solvent. If desired to use solvents, suitable solvents include aliphatic, cycloaliphatic and aromatic hydrocarbons, such as hexane, heptane, cyclooctane, benzene or a hydrocarbon mixture of petroleums boiling between 60 and 200° C. Purified anhydrous starting materials and solvents are employed.

Example I

Autoclaves were charged with butadiene, ferrous acetylacetonate, an amine, triisobutyl aluminum and ethylene in the amounts set forth in Table I. The autoclaves were heated to 80° C. for 17 hours. Thereafter the reaction products were removed from the autoclaves, distilled and analyzed for cis-1,4-hexadiene.

TABLE I

| | Run | | | | |
|---|---|---|---|---|---|
| | 1 | 2 | 3 | 4 | 5 |
| Butadiene: | | | | | |
| Grams | 97 | 85 | 90 | 90 | 90 |
| Mols | 1.8 | 1.6 | 1.7 | 1.7 | 1.7 |
| Ethylene: | | | | | |
| Grams | 50 | 50 | 50 | 50 | 50 |
| Mols | 1.8 | 1.8 | 1.8 | 1.8 | 1.8 |
| Ferrous acetylacetonate: | | | | | |
| Grams | 1 | 1 | 1 | 1 | 1 |
| Millimols | 4 | 4 | 4 | 4 | 4 |
| Triisobutyl aluminum, cc | 1 | 1 | 1 | 1 | 1 |
| Di-n-butylamine: | | | | | |
| Cubic cent | 0.67 | | | | |
| Millimols | 4 | | | | |
| Tri-n-butylamine: | | | | | |
| Cubic cent | | 0.95 | | | |
| Millimols | | 4 | | | |
| 2-Aminobutanol: | | | | | |
| Grams | | | 0.38 | | |
| Millimols | | | 4 | | |
| o-Aminophenol: | | | | | |
| Grams | | | | 0.44 | |
| Millimols | | | | 4 | |
| Glycine: | | | | | |
| Grams | | | | | 0.3 |
| Millimols | | | | | 4 |
| Reaction product, grams | 91.0 | 95.0 | 0 | 100.0 | 95.0 |
| Butadiene, percent | 23.0 | 2.8 | 0 | 3.4 | 12.7 |
| Cis-1,4-hexadiene, percent | 73.9 | 59.1 | 0 | 81.3 | 82.0 |
| 2,4-hexadiene, percent | 3.0 | 38.1 | 0 | 15.3 | 5.3 |

Example 2

Autoclaves were charged with butadiene, ethylene, ferrous acetylacetonate, tributyl aluminum and the listed amino acids or aminophenols in the amounts set forth in the table. The autoclaves were heated to 80° C. for 17 hours, the reaction product removed from the autoclaves, distilled and analyzed for cis-1,4-hexadiene.

| | Run | | | |
|---|---|---|---|---|
| | 1 | 2 | 3 | 4 |
| Butadiene, grams | 90 | 90 | 90 | 90 |
| Ethylene, grams | 51 | 52 | 51 | 51 |
| Ferrous acetylacetonate, gram | 1 | 1 | 1 | 1 |
| Triisobutyl aluminum, cc | 1 | 1 | 1 | 1 |
| p-Aminophenyl acetic acid, gram | 0.6 | | | |
| m-Aminobenzoic acid, gram | | 0.55 | | |
| L plus glutamic acid, gram | | | 0.59 | |
| 2-amino-4-nitrophenol, gram | | | | 0.62 |
| Reaction product, grams | 85 | 74 | 87 | 87 |
| Butadiene, percent | 13.8 | 26.2 | 24.4 | 15.5 |
| Cis-1,4-hexadiene, percent | 85.4 | 73.2 | 74.7 | 83.9 |

The cis-1,4-dienes polymerize readily with ethylene and propylene with reduced heavy metal catalysts to form sulfur vulcanizable products useful, for example, in tires. One commercial and economic advantage of this process is that polymerization grade butadiene-1,3 and isoprene are not required. Streams from ethylene cracking units which contain 1,3-dienes may be used in preparing the cis-1,4-dienes.

I claim:

1. The method for preparing cis-1,4-dienes of 1,4-hexadiene, methyl-1,4-hexadienes and 1,4-heptadiene which comprises reacting a 1,3-diene selected from the group consisting of butadiene-1,3, isoprene and piperylene with ethylene in the presence of a catalyst formed by reacting together in the presence of said 1,3-diene, about $10^{-1}$ to $10^{-8}$ mol of iron per mol of 1,3-diene of a reducible iron compound selected from the group consisting of iron salts of inorganic acids, iron salts of organic acids and iron chelates with about 1 to 10 mol equivalents per mol of iron of an alkyl aluminum compound having the structure $R_3Al$ wherein R is an alkyl group containing 1 to 12 carbon atoms; and about 0.1 to 10 mols, per mol of iron, of an organic nitrogen compound containing 2 to 12 carbon atoms selected from the group consisting of aliphatic amines containing a carboxyl group, and amines containing a phenyl and at least one of a hydroxyl, carboxyl or nitrile group.

2. The method of claim 1 wherein the reducible iron compound is iron acetylacetonate in a concentration of $10^{-3}$ to $10^{-5}$ mol of iron per mol of 1,3-diene, the alkyl of the alkyl aluminum compound contains 2 to 8 carbon atoms and 0.25 to 2 mols of organic nitrogen compound per mol of iron.

3. The method of claim 2 wherein the alkyl aluminum compound is triisobutyl aluminum.

4. The method of claim 1 wherein the organic nitrogen compound is an amino acid.

5. The method of claim 3 wherein the organic nitrogen compound is aminophenol.

6. The method of claim 4 wherein the organic nitrogen compound is glutamic acid.

7. The method of claim 3 wherein the organic nitrogen compound is glycine.

8. The method of claim 3 wherein the organic nitrogen compound is aminobenzoic acid.

9. The method of claim 3 wherein the organic nitrogen compound is 2-amino, 4-nitrophenol.

References Cited

UNITED STATES PATENTS

| 3,405,193 | 10/1968 | Hata et al. | 260—680 |
| 3,441,627 | 4/1969 | Schneider | 260—680 |
| 2,965,627 | 12/1960 | Field et al. | 260—94.9 |
| 3,155,626 | 11/1964 | Boor | 252—429 |
| 3,203,940 | 8/1965 | Long | 260—88.2 |

JOSEPH L. SCHOFER, Primary Examiner

RICHARD A. GAITHER, Assistant Examiner